United States Patent

[11] 3,624,543

| [72] | Inventor | Albert M. Rockwell, Jr.<br>East Palo Alto, Calif. |
|---|---|---|
| [21] | Appl. No. | 62,635 |
| [22] | Filed | Aug. 10, 1970 |
| [45] | Patented | Nov. 30, 1971 |
| [73] | Assignee | Laser Sciences, Inc.<br>Bethel, Conn.<br>Continuation of application Ser. No. 641,965, May 29, 1967, now abandoned. This application Aug. 10, 1970, Ser. No. 62,635 |

[54] GAS COHERENT RADIATION GENERATOR WITH SEGMENTED CERAMIC DISCHARGE TUBE HAVING INTEGRAL GAS RETURN PATHS
10 Claims, 9 Drawing Figs.

| [52] | U.S. Cl. | 331/94.5 |
|---|---|---|
| [51] | Int. Cl. | H01s 3/00 |
| [50] | Field of Search | 331/94.5 |

[56] References Cited
UNITED STATES PATENTS

| 607,932 | 7/1898 | Husham | 138/111 |
|---|---|---|---|
| 1,785,403 | 12/1930 | Babb | 138/115 |
| 3,172,057 | 3/1965 | Bennet | 331/94.5 |
| 3,226,822 | 1/1966 | Budde et al. | 29/473.1 |
| 3,387,226 | 6/1968 | Haisma et al. | 331/94.5 |
| 3,394,320 | 7/1968 | Medicus | 331/94.5 |
| 3,427,564 | 2/1969 | Okaya et al. | 331/94.5 |

OTHER REFERENCES

Labuda, E. F. et al., " Continuous Duty Argon Ion Lasers," IEEE Journal of Quantum Electronics. Vol. QE- 1, No. 6, Sept. 1965. p. 273– 279.

Sperry Engineering Review. Vol. 19, No. 1. Received June 2, 1966, p. 27– 31. TL589A.1568.

*Primary Examiner*—Ronald L. Wibert
*Assistant Examiner*—T. Major
*Attorney*—Robert W. Dilts ABSTRACT: $B_eO$ ceramic discs are provided with a centrally located bore and smaller bores radially spaced therefrom. The discs are joined together in a stack by copper rings brazed to facing metallized portions of adjacent discs of the stack. The copper rings are selected to have an inside diameter so that the rings will not mask the bores when the discs are assembled in a stack. The discs are joined to define a capillary discharge tube with the centrally located bore aligned along an optically straight path, and to have the radially spaced smaller bores intercommunicated to define gas return paths.

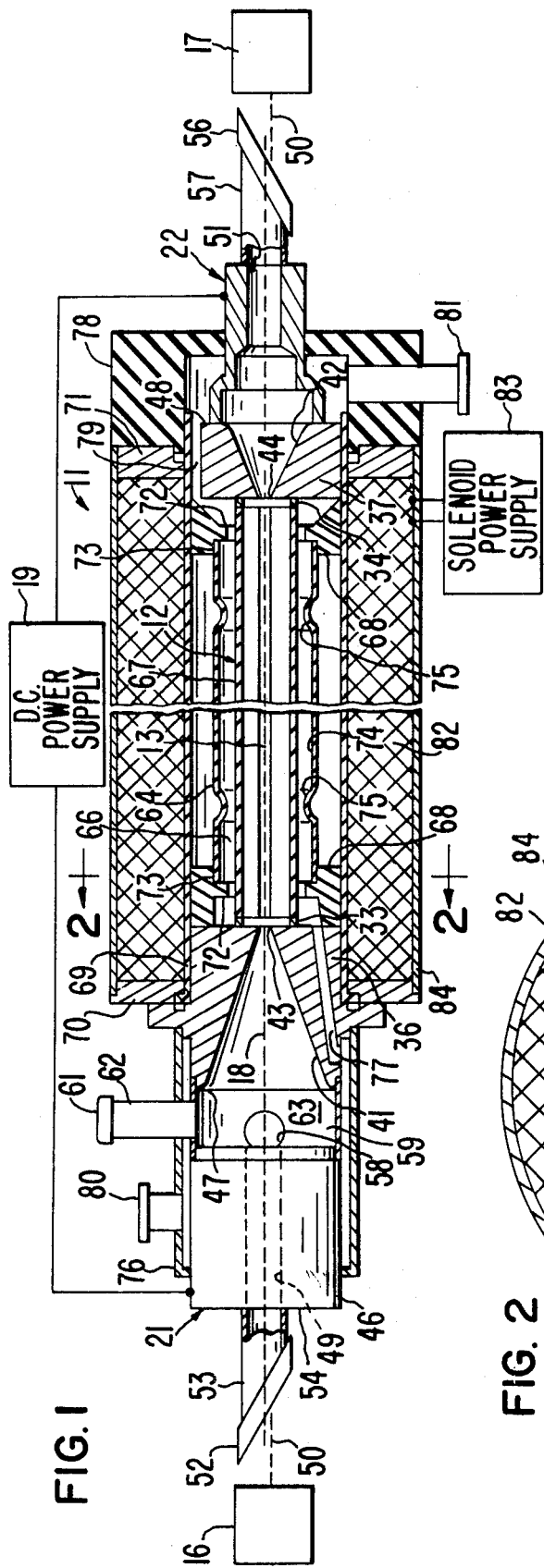
FIG. 1
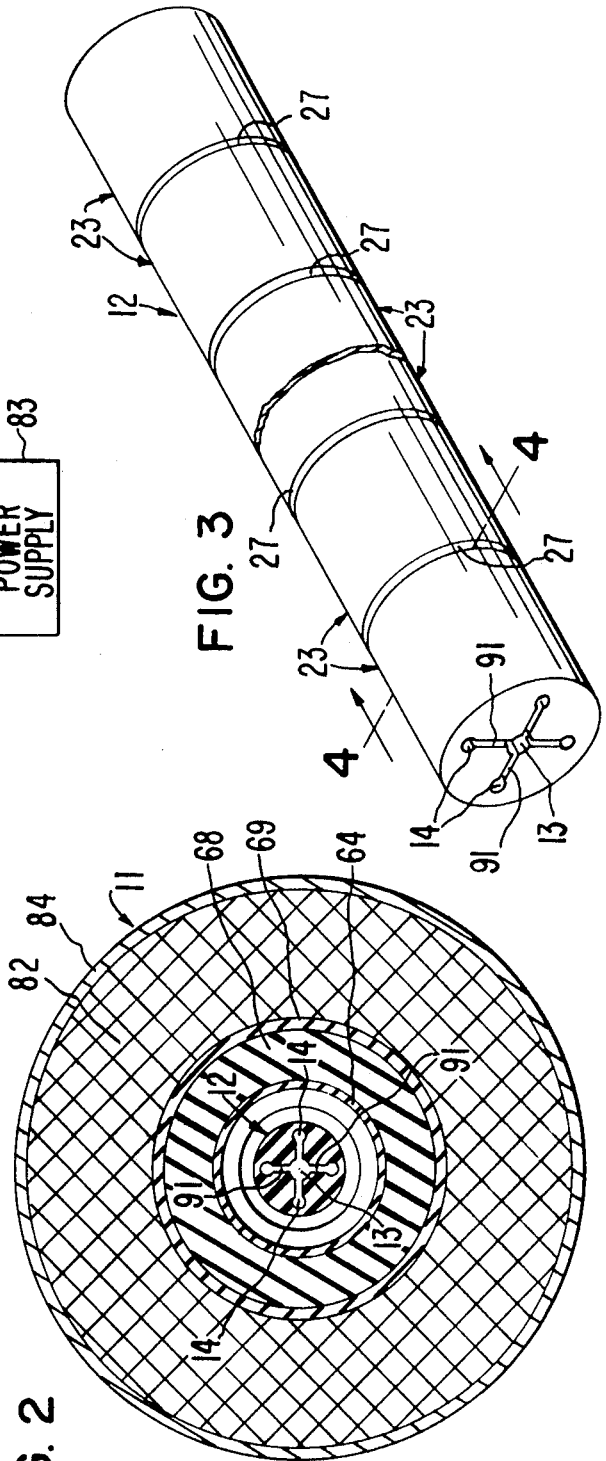
FIG. 2
FIG. 3
INVENTOR.
ALBERT M. ROCKWELL
BY
Ralph L. Mossino

PATENTED NOV 30 1971 3,624,543

INVENTOR.
ALBERT M. ROCKWELL
BY
Ralph L. Mossino

GAS COHERENT RADIATION GENERATOR WITH SEGMENTED CERAMIC DISCHARGE TUBE HAVING INTEGRAL GAS RETURN PATHS

This is a continuation of Ser. No. 641,965, filed May 29, 1967 now abandoned to be filed after the abstract.

BACKGROUND OF INVENTION

The present invention relates to gas coherent radiation generators and, more particularly, to coherent radiation generators having ceramic discharge tubes.

In the gas laser art, fused quartz is the most common material used to construct the discharge tubes. However, fused quartz devices are limited to operating at current densities below about 500 amps per square centimeter (A./cm.$^2$) because of their inability to retain their structural integrity in the presence of large amounts of heat generated by impinging electrons of high energy discharges. Heretofore, efforts to overcome the deficiencies of fused quartz devices practically either have been unsuccessful or unsatisfactory. For example, cathode emission has severely limited the general use of large bore devices. With respect to metallic discharge tubes, such devices are characterized by the undesirable effects associated with sputtering at the metallic surface about the periphery of the discharge column. Ceramic materials have been used to construct the discharge tube and gas return paths of gas lasers. However, because of the length of standard gas laser discharge tubes, generally, at least 30 centimeters, and the difficulty of extruding ceramic materials, the discharge tube and gas return path structures are constructed as separate units. Such gas laser devices are undesirably large and bulky. Ceramic gas discharge tubes having integral gas return paths have not come into common use because of the great difficulty involved in fabricating them by mass production techniques.

SUMMARY OF THE INVENTION

The present invention is a gas coherent radiation generating device which overcomes the limitations and disadvantages of the prior art devices. More particularly, the device of the present invention includes a gas discharge tube structure having a plurality of ceramic segments each provided with a first bore for confining a gas discharge and at least a second bore spaced therefrom for defining a gas return path. The cross section of the smaller bore is adjusted relative to that of the first bore so that when the ceramic segments are assembled, the gas discharge column preferentially will be formed along the path defined by the first bores. The ceramic segments are joined together with their first bores aligned and with the bores of adjacent ceramic segments in gas flow communication. Towards facilitating construction of the discharge tube, in one embodiment of the tube, the ceramic segments are joined by apertured metallic members brazed to facing metallized portions of adjacent segments. The sizes of the apertures defined by the metallic members are adjusted to allow gas flow communication between the bores of adjacent ceramic segments and, preferably, so that the metallic members surround the periphery of the first bores in lateral-spaced relation thereto. By removing the metallic members from the zone of the gas discharge, sputtering is avoided, hence, the concomitant harmful effects eliminated.

The engineering problem associated with fabricating prior art ceramic-type gas discharge tubes, e.g., providing bores in long sections of ceramic pieces, is obviated by the segmented construction of the discharge tube of the present invention. Furthermore, by constructing the ceramic discharge tube to have integral discharge and gas return paths, a very compact and lightweight gas laser device can be provided which is able to operate at discharge current levels at least two times greater than those of the more bulky and heavier gas laser devices employing quartz discharge tubes.

In operation, the segmented ceramic discharge tube defines a chamber for containing a gaseous active material which upon excitation produces coherent radiation. The discharge tube is mounted between reflective surfaces which together with the discharge tube define a resonant structure tuned to the radiation frequency. A suitable energy source is provided to excite the ions in the active material to a higher energy state which upon returning to the original lower energy state emit coherent electromagnetic radiation.

When operating at high current density levels, it is desirable to cool the discharge tube. The segmented construction of the discharge tube of the present invention facilitates such cooling. More particularly, cooling can be accomplished by extending interposed metallic members outward from the outer surface of the discharge tube to define fins thereabout. Cooling of the tube can be further facilitated by providing a suitable jacket surrounding the discharge tube to direct a flow of fluid coolant over the outer surface thereof.

Accordingly, it is an object of the present invention to provide a compact and lightweight gas coherent radiation generator.

More particularly, it is an object of the present invention to provide such a generator having a ceramic-type discharge tube.

A further object of the present invention is to provide a gas coherent radiation generator having a discharge tube structure with integral gas return paths.

Another object of the present invention is to provide a ceramic-type discharge and gas return path defining structure suited for fabrication by mass production techniques.

Still a further object of the present invention is to provide a gas coherent radiation generator operable at discharge current density levels in excess of those possible with gas coherent radiation generators employing discharge tubes of fused quartz.

Another object of the present invention is to provide a rugged gas coherent radiation generator able to withstand severe mechanical shock and vibration.

It is still a further object of the present invention to provide a ceramic gas discharge tube structure which facilitates enhanced cooling thereof.

BRIEF DESCRIPTION OF THE DRAWINGS

The foregoing and other objects and advantages of the gas coherent radiation generator of the present invention will become more apparent from the following detailed description and appended claims considered together with the accompanying drawings in which:

FIG. 1 is a cross-sectional view of a gas laser embodiment of the gas coherent radiation generator of the present invention.

FIG. 2 is a cross-sectional view of the gas laser taken along line 2—2 of FIG. 1.

FIG. 3 is a perspective view of one embodiment of the segmented ceramic discharge tube of the present invention.

DESCRIPTION OF PREFERRED EMBODIMENTS

Figure 4:
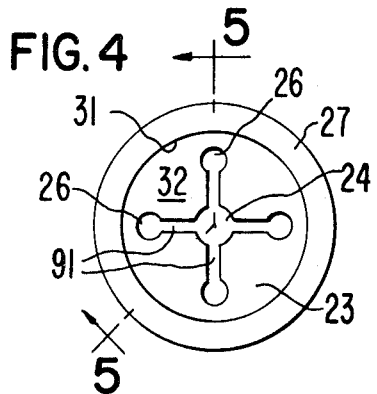
FIG. 4 is a cross-sectional view of the discharge tube taken along line 4—4 of FIG. 3.
Figure 5:
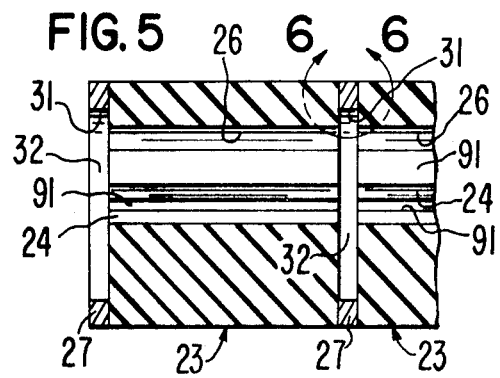
FIG. 5 is a cross-sectional view of the discharge tube taken along line 5—5 of FIG. 4.
Figure 6:
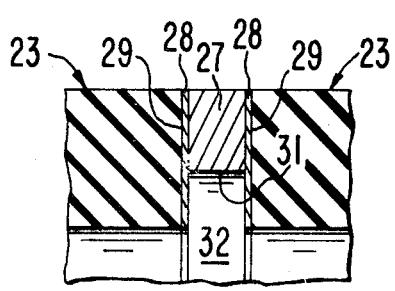
FIG. 6 is a portion of FIG. 5 delineated by line 6—6 illustrating the metal-to-ceramic bond formed between the ceramic segments and interposed metallic members forming the segmented ceramic tube.

Referring to FIGS. 1 and 2, the coherent radiation generator 11 constructed in accordance with the present invention includes a segmented ceramic discharge tube 12 defining an evacuable discharge passage 13 and gas return paths 14. To provide a resonant structure for the coherent radiation produced by an active gas located in the discharge passage 13, reflecting end devices 16 and 17 are positioned opposite the ends of the discharge tube 12 at points optically aligned with the axis 18 of the discharge passage 13 to defined the ends of the resonant structure. The active gas is excited to produce coherent radiation by energy supplied by source 19 coupled by means 21 and 22 to initiate and maintain a discharge in the active gas.

One embodiment of the segmented ceramic discharge tube 12 is illustrated in FIGS. 3—6. The discharge tube 12 includes ceramic segments, such as beryllium oxide (BeO) discs 23, each having a centrally located bore 24 and smaller bores 26 radially spaced therefrom. The bores 26 are made smaller so that the impedance to a current discharge is higher through bores 26 than through bores 24. Hence, when the ceramic segments 23 are assembled to form the discharge tube 12, the current discharge will preferentially take place along the passage 13 defined by the larger centrally located bores 24. Any degree of reduction in the size of bores 26 relative to bores 24 will cause the discharge to favor the passage 13. However, it has been found that when the discharge tube 12 is located with its discharge passage 13 aligned with the axis of an axial symmetric magnetic field, adjusting the cross-sectional area of bore 24 to be 1.5 times that of bores 26 is more than adequate to insure that the discharge column will be formed along the discharge passage 13.

To form the segmented tube 12, the BeO discs 23 are joined together end to end, preferably, by apertured metallic members 27, for example, of a copper base material. The copper members 27 are interposed between adjacent discs 23 of the tube 12 and brazed to metallized layers 28 formed on the end surfaces 29 of adjacent discs 23. Preferably, the copper members 27 are brazed to the metallized layers 28 to form vacuum-tight joint between the copper members 27 and BeO discs 23. By forming vacuumtight joints, the segmented ceramic tube 12 itself can be used as the vacuum-defining structure for the discharge passage 13. The metallized layers 28 can be formed and the copper members 27 joined thereto by the techniques described in either U.S. Pat. No. 2,996,401 or No. 3,226,822.

The metallic members 27 are apertured to allow the centrally located bores 24 of the joined discs 23 to be aligned along an unobstructed axis 18 to define the discharge passage 13. To facilitate the initiation and maintenance of a high current density discharge column, i.e., greater than 500 A./cm.$^2$, the bores 24 are aligned to define a discharge tube axis 18 which is at least 80 percent optically straight. The metallic members 27 also are apertured to allow gas flow communication between the smaller radially spaced bores 26 of the discs 23 and thereby provide gas return paths 14 between ends of the discharge tube 12.

To facilitate manufacturing and assembling of the BeO discs 23, ring-shaped copper members 27 are employed to join the discs together. More specifically, each copper ring 27 defines an aperture 31 having a radius larger than the greatest radial distance that a smaller bore 26 is spaced from the discharge tube axis 18. This construction leaves a space 32 between adjacent discs 23 with all of the smaller bores 26 of the adjacent discs opening into the space. The space 32 provides gas flow communication between the smaller bores 26 of the adjacent discs 23, and since gas can flow along tortuous paths, the smaller bores of the discs do not have to be aligned to define straight gas return paths 14. Therefore, when assembling the multibored BeO discs 23, only the bores 24 defining the discharge passage 13 have to be accurately aligned. As will be appreciated, this greatly simplifies manufacturing and assembling of the BeO discs since the bores 24 and 26 do not have to be accurately located in each disc and, except for the centrally located bore 24, they do not have to be accurately positioned during assembly.

Also, by purposely misaligning the smaller bores 26 defining the gas return paths 14, the paths can be made tortuous and longer. Both of these factors serve to protect against the initiation of a discharge along the gas return paths 14. Furthermore, if the thickness of the copper rings 27 are made small compared to the diameters of the bores 26, i.e., the spacing between adjacent discs 23 made small, constrictions will be formed along the gas return paths 14. These constrictions will further serve to impede the formation of a discharge along the gas return paths 14. By providing the tortuous path formed by offsetting the bores, 26, these bores may be made as large or larger than bore 24. By virtue of the longer path formed, the discharge will still preferentially take place along bore 24.

By constructing the metallic members 27 so that they do not extend to the zones of the discharge passage 13, i.e., so that the metallic members surround the periphery of the bores 24 defining the discharge passage 13 in lateral or radial spaced relation thereto, the undesirable sputtering that commonly occurs at metallic surfaces in the presence of an ionic discharge column is suppressed. To make certain that the discharge column will not reach the surfaces of the metallic members 27 radially spaced from the bores 24, the thickness of the metal members is made small when compared to the diameter of the bores 24. By so constructing the segmented ceramic discharge tube 12, the undesirable sputtering will be avoided.

In one embodiment of the coherent radiation generator 11 constructed to provide a discharge of 900 A./cm.$^2$ and generate 1.0 watt of coherent light at 4,825, 5,208, 5,682 and 6,471 angstroms (A) from krypton gas, 57 BeO discs 23 were joined to define a discharge passage 13 approximately 24 inches long. The discs 23 had a 0.625 inch diameter and 0.375 inch length and were joined together by copper rings 27 having an inside diameter of about 0.375 inch, an outside diameter of 0.625 inch, and a thickness of between 0.010 and 0.020 inch. The diameter of the centrally located bores 24 measured 0.081 inch. The smaller bores 26 had a 0.063 inch diameter and were radially spaced about 0.125 inch from the centrally located bores 24.

The segmented nature of the ceramic discharge tube 12 facilitates the manufacture of the discharge tube by mass production techniques. More particularly, prior to assembling the discharge tube 12, each of the ceramic segments 23 are formed by standard ceramic press-forming techniques. Then, the ceramic segments 23 are metallized and joined together by brazing them to metallic members 27 to form the discharge tube 12. Although small segments of ceramic materials can be molded, bored, drilled reamed or otherwise machined to form bores therethrough, it is exceedingly difficult to form long pieces of bored ceramic in the same fashion. This is true even if a pilot bore is provided for machining because of the extreme difficulty involved in forming ceramic pieces with long bores having the degree of rectilinearity required by the centrally located bore 24 defining the discharge passage 13 of the assembled tube 12.

Although a particular form of a segmented ceramic discharge tube 12 is illustrated in the drawings, it should be appreciated that many variations are possible. For example, the ceramic segments 23 could take shapes other than discoidal and have any number of bores 24 and 26. Also, the number of bores in the ceramic segments 23 may vary from disc to disc, especially, when bores 26 defining the gas return paths 14 are coupled by a space such as that identified by reference numeral 32 in FIG. 5. Furthermore, the ceramic segments 23 can be joined other than be metallic member 27 brazed to metallized layers 28 on the segments. For example, they could be joined together by a mechanical holding means or by other bonding means. Bonding the segments together by metallizing techniques facilitates the formation of vacuumtight bonds between the segments. However, when metallic members 27 are used they do not have to be ring shaped. They could be planar structures with separate apertures provided for each of the bores of each of the ceramic segments. It should be further noted that the bores 24 defining the discharge column 13 could be located other than centrally in the ceramic segments. However, by centrally locating the bores 24, it is easier to assure that the current discharge column will be confined to the discharge passage 13 in the presence of a confining magnetic field.

Referring again to FIGS. 1 and 2, a cylindrical form of the segmented ceramic discharge tube 12 constructed to operate with krypton active gas is provided with apertured metallic rings 33 and 34 brazed to metallized portions of the ceramic segments at the opposite ends of the discharge tube 12. The discharge tube 12 is mounted between copper tube supports 36 and 37 by welding copper rings 33 and 34 respectively to tube supports 36 and 37. Each of the tube supports 36 and 37 defines one of the truncated conical apertures 41 and 42 aligned with the axis 18 of the discharge passage 13 with their respective truncated ends 43 and 44 juxtaposed the ends of the discharge tube 18.

To initiate and maintain a discharge in the krypton gas contained within the discharge passage 13, the tube 12 and supports 36 and 37 are mounted between a heavy duty cathode-type energy coupling means 21 supported within housing 46 and an anode-type energy coupling means 22. Energy for the discharge is supplied by a DC energy source 19. The cathode housing 46 is joined, as by brazing, at the base end 47 of the tube support 36. The anode 22 is joined, as by brazing, to extend from the base end 48 of the tube support 37.

An aperture 49 and an aperture 51 are provided respectively through cathode structure 21 and anode structure 22 in alignment with the discharge tube axis 18. These apertures 49 and 51 provide passageways through the cathode and anode structures so that the light generated in the gas discharge can be reflected many times in the resonant structure defined between the mirror-type reflected devices 16 and 17 located outside the region defined between the anode and cathode structures along the apparent axis 50 of the generated beam of coherent radiation. One of the reflecting end mirrors, for example, 16 is partially transparent so that output light can be obtained from the coherent radiation generator of laser 11.

In order to be able to locate the mirrors 16 and 17 outside the gas region, a first Brewster-angle window 52 is hermetically joined by a tubular member 53 to the end wall 54 of the cathode housing 46 in alignment with the aperture 49. Similarly, a second Brewster-angle window 56 is hermetically joined by a tubular member 57 to end of the anode 22 in alignment with aperture 51. The Brewster-angle windows 52 and 56 refract the beam of light generated in the discharge thereby displacing the beam from a path along the actual axis 18 to a path along the apparent axis 50.

The Brewster-angle windows 52 and 56, the tubular members 53 and 57, cathode 21, anode 22, tube supports 36 and 37, and discharge tube 12 are hermetically joined to define an evacuable chamber. The active gas is introduced through inlet port 58 provided in the sidewall 59 of the cathode housing 46. In order to inspect the discharge established between the cathode 21 and anode 22, the cathode 21 is mounted spaced from the tube support 36. A window 61 is hermetically mounted to a viewing port 62 extending from the cathode housing sidewall 59 at a location opposite the space 63 between the cathode 21 and tube support 36.

To cool the discharge tube 12, a glass jacket 64 is mounted to surround the tube and defined a space 66 therebetween for conveying fluid coolant, such as water, over the outer surface 67 of the tube. The glass jacket 64 is supported at each of its ends about tube 12 by ring-shaped spacers 68 of nonmagnetic insulating material such as Teflon, a fluorinated hydrocarbon. The spacers 68 are wedgingly supported within a glass tubular member 69 surrounding the jacket 64. The glass tube 69 is secured to the tube supports 36 and 37 by mounting rings 70 and 71. Each spacer 68 has a ridge portion 72 circumferentially around its inner periphery to define a shoulder 73 thereabout. The glass jacket 64 is seated on the shoulders 73 to support it spaced from the discharge tube 12. As is well known, under smooth or laminar fluid flow conditions, as the fluid flows past a heated surface a film of fluid is formed immediately adjacent to the heated surface whose velocity varies from zero at the heated surface to the velocity of the main flow at its outer surface. This film has a high resistance to thermal conduction, hence, impeding the transfer of heat from the hot surface to the fluid coolant.

Towards eliminating this film and thereby enhancing the heat transfer from discharge tube 12 to the fluid coolant, the inside surface 74 of the glass jacket 64 is undulated by forming projections or dimples 75 at intervals along the surface 74. In the embodiment of FIGS. 1 and 2, the undulations are in the form of ⅛-inch wide circular ridges about the circumference of the inside surface at 1½-inch intervals. As the fluid coolant is directed through the space 66 between the jacket 64 and discharge tube 12, the undulated jacket surface 74 induces the fluid coolant to flow turbulently. This turbulent flow serves to prevent the formation of a high thermally resistive film of coolant around the outer surface 67 of discharge tube 12.

The fluid coolant also can be utilized to cool the cathode housing 46 and anode 22. To cool the cathode housing 46, a copper jacket 76 is mounted to surround the cathode housing 46 and is coupled to the glass jacket 64 by passageway 77 extending through tube support 36. The anode 22 is cooled similarly by providing a Teflon jacket 78 therearound which is coupled to the glass jacket 64 by passageway 79 defined by the tube support 37 having a triangular cross-sectional configuration. Fluid coolant is introduced into the jacket 76 through port 80 and taken out from jacket 78 through port 81.

To reduce the radial diffusion of the discharge column formed within the discharge passage 13, and hence losses to the walls of the discharge tube 12, magnetic field generating means, such as solenoid 82 energized by a power supply 83, is mounted about the discharge tube 12 to provide a axial magnetic field extending through discharge passage 13. The solenoid 82 is supported about tube 12 by the nonmagnetic glass tubular member 69 and is held in place by a tubular member 84 of magnetic material secured, as by welding, to the mounting rings 70 and 71 also of magnetic material. The discharge tube 12, preferably, is positioned within the axial magnetic field so that the magnetic field is axially symmetric about the discharge passage axis 18. This positioning of the discharge tube is the most favorable for assuring that the discharge column will be formed along passage 13.

Figure 7:
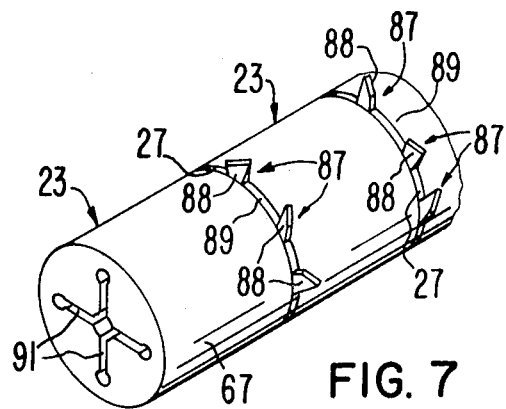
FIG. 7 is a perspective view of a portion of another embodiment of the segmented ceramic discharge tube of the present invention.
Figure 8:
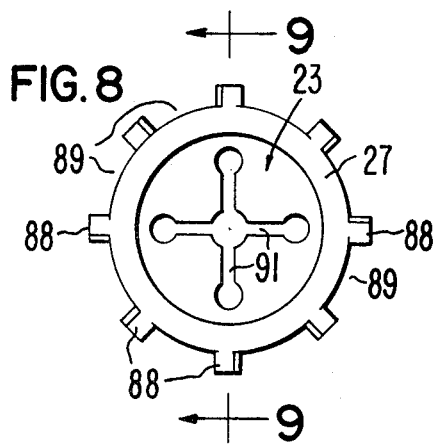
FIG. 8 is a cross-sectional view of the laser discharge tube taken along line 8—8 of FIG. 7.
Figure 9:
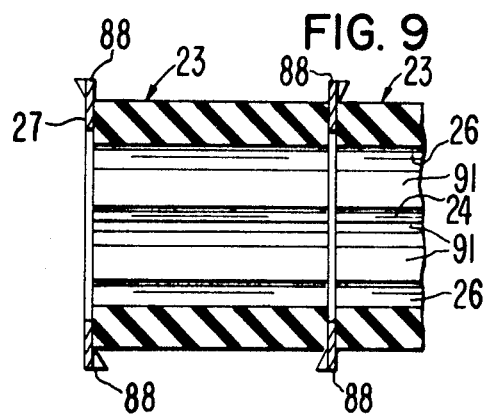
FIG. 9 is a cross-sectional view of the laser discharge tube taken along line 9—9 of FIG. 8.

Referring now to FIGS. 7-9, an embodiment of the discharge tube 12 constructed to facilitate cooling thereof is illustrated. More specifically, the metallic members 27 are provided with fin extensions 87, preferably integral with the metallic members 27, which project outward from the outer surface 67 of the tube 12. The increased surface area of the metallic members 27 exposed to the environment surrounding the tube 12 increases the rate at which heat can be radiated to the surroundings.

Cooling of the discharge tube 12 can be further facilitated by passing a fluid coolant, such as air or water, over the outer surface 67 of the tube embodiment having cooling fin extensions 87. To obtain a flow of fluid coolant close to the surface of the ceramic discs 23 the fin extension 87 associated with each metallic member 27 is notched at a plurality of locations to define tabs 88 spaced about the circumference of the metallic members 27. The tabs 88 are canted to the direction of flow of fluid coolant to define spaces 89 therebetween for the coolant to flow between the tabs 88. The canted tabs 88 provide the means for inducing the fluid coolant to flow turbulently over the outer surface 67 of discharge tube 12. More specifically, turbulent flow will be induced by canting the tabs 88 extending from adjacent metallic members 27 in opposite directions relative to the flow of the fluid coolant. By canting the tabs 88 in this fashion, there will not be a straight, uninterrupted path for fluid flow through adjacent fin extensions 87. As a result, the direction of the flow will change often. This creates the desired turbulence in the flow of the fluid coolant.

One of the principal reasons for cooling the discharge tube 12 is to maintain the structural integrity of the tube 12 when operating at high discharge current density levels. Unfortunately, in normal use, the ceramic segments 23 are exposed to large radial temperature gradients when operated at high discharge current levels and repeatedly cycled through large temperature ranges. As a result, destructive internal stress centers may be formed.

To minimize the formation of deleterious stresses in the ceramic segments 23, the segments are provided with slots 91 extending the length of the segments. To inhibit the formation of localized stress centers, the slots 91 are arranged so that one extends radially from the central bore 24 to each of the radially spaced smaller bores 26. The width of the slots 91 is made less than the diameter of the smaller bores 26. It should be appreciated that the slots 91 also serve to provide gas flow communication between the central bore 24 and each of the radially spaced smaller bores 26 for the entire length of the discharge tube 12. This assists in maintaining a uniform pressure along the discharge path 13 during the operation of the coherent radiation generator 12.

From the foregoing description of the preferred embodiments illustrated in the drawings, it should be appreciated that the segmented ceramic discharge tube having integral gas return paths enables the construction of a gas coherent radiation generator more compact, light weight and economical than heretofore possible. These are particularly important considerations when constructing such apparatus for space or airborne uses. These outstanding features coupled with the ease by which the segmented discharge tube can be manufactured and its capability of operating at discharge current density levels greater than possible with fused quartz devices makes the gas coherent radiation generator of the present invention extremely attractive for all uses.

What is claimed is:

1. A hermetically sealed discharge tube containing an active gas and having a discharge bore therein for use with reflective means opposite each end thereof aligned with said bore and means for coupling energy to said gas to produce coherent radiation, said hermetically sealed discharge tube comprising a plurality of ceramic segments each having end surfaces and each defining a portion of said discharge bore and a portion of another bore spaced therefrom extending between the end surfaces, means hermetically bonding said ceramic segments together, means coupling the ends of said discharge bore and said other bore in gas flow communication, the length to cross section ratio of said other bore being dimensioned relative to the length to cross section ratio of said discharge bore such that a gas discharge column preferentially will be formed along said discharge bore.

2. A gas coherent radiation generator comprising a hermetically sealed segmented ceramic discharge tube containing an active gas, the ceramic segments of said discharge tube each having end surfaces and each defining a first bore and another bore spaced therefrom extending between the end surfaces, means hermetically bonding said ceramic segments together with end surfaces adjacent so that the first bores are aligned to define a gas discharge passage and said other bores in gas flow communication to define a gas return path, said bonding means including metallized layers formed on the end surfaces of said ceramic segments and metallic rings having a thickness smaller than the diameter of said first bores hermetically bonded to facing metallized layers formed on said end surfaces of adjacent segments, said metallic rings each defining one aperture through which both the first and other bores of adjacent segments are coupled in gas flow communication, the cross section of the other bores being dimensioned relative to those of the first bores, and the length of said gas return path being dimensioned relative to the length of said gas discharge passage so that a gas discharge column preferentially will be formed along the gas discharge passage; means for coupling said gas return path and said discharge passage in gas flow communication; reflective means opposite each end of the segmented ceramic discharge tube aligned with said discharge passage; and means for coupling an energy source to said active gas to produce coherent radiation.

3. The apparatus according to claim 2 wherein the cross sections of the other bores are smaller than those of the first bores.

4. The apparatus according to claim 2 wherein said metallic rings include metallic extensions joined to said metallic members and extending outward from the joined ceramic segments.

5. The apparatus according to claim 4 wherein said metallic extensions are tabs circumferentially spaced about each of said metallic members.

6. The apparatus according to claim 2 wherein each ceramic segment is provided with at least one slot extending between the end surfaces and interconnecting said first bore and said other bore.

7. The apparatus according to claim 2 wherein said ceramic segments are beryllium oxide and said metallic rings are copper.

8. The apparatus according to claim 2 further comprising a cooling jacket mounted to surround the joined ceramic segments to define a passageway for directing a flow of fluid coolant over said ceramic segments.

9. The apparatus according to claim 8 wherein said cooling jacket has an undulated surface juxtaposed the joined ceramic segments.

10. The apparatus according to claim 2 wherein said ceramic segments are rotationally oriented such that said other bores are misaligned whereby said gas return path is longer than said gas discharge passage.

* * * * *